3,553,834
METHOD OF MAKING A HEATING CARPET
Franciszek Olstowski, Freeport, and John D. Watson, Sr., and Wallace T. McMichael, Lake Jackson, Tex., assignors to The Dow Chemical Company, Midland, Mich., a corporation of Delaware
No Drawing. Original application Mar. 22, 1965, Ser. No. 441,905, now Patent No. 3,492,197. Divided and this application Nov. 12, 1968, Ser. No. 775,163
Int. Cl. H05b 3/38
U.S. Cl. 29—611       2 Claims

ABSTRACT OF THE DISCLOSURE

A method of making a heating carpet using a compressed vermicular graphite as a resistance heating element wherein a layer of compressed vermicular graphite is applied to the backing of a carpet and a second backing is added to cover the compressed graphite layer. Electrical contact is then made between the graphite layer and an electrical source to cause current to flow through the graphite layer thereby heating the carpet by electrical resistance.

---

This application is a divisional of application Ser. No. 441,905, filed Mar. 22, 1965, now Pat. No. 3,492,197.

This invention relates to a method of preparing novel forms of compressed graphite and more particularly is concerned with a process for compressing expanded graphite into various shapes and forms wherein the resulting graphitic structure has extremely desirable properties, or onto various substrates or supports, and to the products prepared thereby.

A principal object of the instant invention is to provide a method for producing novel forms of compressed graphite.

An additional object is to provide a method for producing novel compressed forms and shapes of graphite which have unexpected desirable properties including, for example, high electrical and thermal conductivity, high or low anisotropic ratios, low liquid and gas permeabilities, resistance to high temperature oxidation, and excellent mechanical properties.

These and other objects and advantages of the instant invention will become apparent from reading the detailed description thereof set forth hereinafter.

In accordance with the instant invention, novel forms of graphite are prepared by providing a supply of an expanded particulate graphite and compressing said expanded graphite at predetermined pressures and directions into predetermined forms of cohered graphite.

Expanded graphite used in the present invention is prepared from particulate naturally occurring crystalline flake graphite or crystalline lump graphite, flake graphite being preferred. The crystalline graphite is given a particular acid treatment and the so-treated flake is heated at certain operable temperatures thereby expanding into the low density vermicular feed stock suitable for use in the present invention. The particle size of graphite to be used is not critical although ordinarily particles of from about 10 to about 325 mesh U.S. Standard Sieve are used. Larger flakes (about 10 to 50 mesh) are generally preferred, however, because as a general rule stronger compacted articles are produced from the expanded graphite prepared from these flakes. Further, larger flakes give a low density expanded graphite than smaller flakes.

More particularly, the present invention comprises providing a supply of an expanded vermicular graphite having an apparent bulk density as low as about 0.1 pound per cubic foot (lb./ft.$^3$) and no more than about 10 lb./ft.$^3$ and preferably within the range of from about 0.2 to about 2 lb./ft.$^3$, compressing the expanded vermicular graphite at pressures from about 5 to about 50,000 pounds per square inch (p.s.i.) or more, in predetermined directions in a mold or other forming apparatus. The actual pressure applied and the manner of pressure application (that is, uniaxially, biaxially, or triaxially), is dependent on the type of formed product desired or required. As the applied pressure is increased on the expanded vermicular graphite the bulk density of the resulting compact increases correspondingly. To illustrate, a compressed fabrication having a bulk density of about 10 lb./ft.$^3$ results at an applied pressure of about 20 p.s.i.; the product exhibits a bulk density of from about 100 to about 120 lb./ft.$^3$ at applied pressures in the order of 4000 to 25,000 p.s.i. or higher. Other properties of the resulting compacted article also can be varied depending on the degree of compaction, for example, increased electrical and thermal conductivities result with increasing formation pressures in the plane perpendicular to the compression vector, and improved mechanical properties (for example tensile and compressive strengths) are realized at higher pressures. An unexpected but valuable advantage of the present invention is the production of fabrications at increasing pressures which exhibit thermal and electrical anisotropy. The electrical anisotropy (that is the ratio of electrical resistances parallel to and normal to the applied compression vector(s)) of the compacts increase from a value of unity at about 10 p.s.i. applied pressure up to about 250 or more when applied pressures reach 10,000 p.s.i. or more.

The present invention is particularly suitable for preparing compressed vermicular graphite structures exhibiting excellent anisotropic properties. Such a graphite compact is prepared in accordance with the instant invention by uniaxially compressing the expanded vermicular graphite. Such products exhibit an electrical anisotropic ratio as high as 300:1 and a thermal anisotropic ratio as high as 300:1 compared to a maximum of only about 4:1 and 4:1, respectively, for a conventional form of synthetic (Acheson-Process type) polycrystalline graphite at comparable densities. In addition, the compressed vermicular graphite product of the instant invention can yield higher densities than the conventional synthetic polycrystalline graphite. These densities may be up to and approaching the theoretical density of graphite. Other advantages include a lower gas permeability to helium, a product which is more resistant to high temperature oxidation, has a higher thermal conductivity (as much as two or more times higher than copper below 60° C. and about six or more times higher than synthetic (Acheson-Process type) polycrystalline graphite), and has a higher electrical conductivity (two or three times higher than Acheson-Process type synthetic graphite).

A further advantage of the method of the instant invention incorporating uniaxial compression on the vermicular expanded graphite is that it can produce a highly flexible, impermeable graphite foil or sheet having a thickness as low as about 0.001 inch. Using expanded graphite having a density of from about 0.2 to about 2.0 lb./ft.$^3$, pressures of from about 100 to about 50,000 p.s.i. should be applied hereto in obtaining these foils. In addition to being highly flexible, the foil unexpectedly has a very high thermal and electrical conductivity in the plane of the foil (normal to the compression vector) but behaves as a thermal and electrical insulator across the thickness of the foil.

Compressed expanded vermicular graphitic structures having near-isotropic properties can also be made in accordance with the instant method. Such structure with reduced electrical and thermal anisotropic properties can be prepared by biaxially compressing expanded vermicular graphite (i.e. in two mutually perpendicular axes—sequentially or simultaneously). The vector of high thermal and electrical conductivity is in a direction perpendicular to the biaxial compression vectors. The anisotropic ratio (electrical or thermal) of these biaxially compressed graphite structures can be controlled by the pressure applied in each of the two directions during the biaxial compression. For example, if slight pressure is applied along an axis $a$ and great pressure applied along an axis $b$ (which is perpendicular to axis $a$), axis $c$ (which is perpendicular to axes $a$ and $b$) would be the vector of high thermal and electrical conductivity. The minimum anisotropy ratio would occur between the $c$ and $a$ axes.

The electrical and thermal conductivity values in the high conductivity direction of the biaxially compressed graphite compacts are approximately equal to the values in the high conductivity direction in the uniaxially compressed vermicular graphite (at equal densities), but the low conductivity vector values of biaxially compressed graphite is many times more conductive than the values of the low conductivity vector of uniaxially compressed vermicular graphite. Therefore, the biaxially compressed vermicular graphite exhibits the improved characteristics of uniaxially compressed vermicular graphite without the high anisotropy in applications where high electrical or thermal anisotropy would be objectionable. In addition, the unaxially compressed material has lower tensile strength in the direction parallel to the compression vector than in the direction normal to the compression vector. However, the biaxially compressed graphite has a several old increase in tensile strength in its weak direction.

In accordance with the instant method, a volume of expanded vermicular graphite can be placed in a vessel so that a chosen axis or direction will lie in such a manner that when radial compression forces are applied (such as by using pressurized fluids), the compression forces act directly on all surfaces except those at the ends of the chosen axis; that is, the compression force is isostatic except at the end of the so chosen axis. For example, a cylinder of expanded vermicular graphite is compressed along the radius, but the compression forces are prevented from acting on the axis of the cylinder by keeping the ends of the solid cylinder in a fixed position. This yields a compact having high thermal and electrical conductivity parallel to the axis of the solid cylinder.

The properties of a compressed (e.g. at about 100 p.s.i. or greater) graphite structure can be made more nearly isotropic by triaxially compressing the expanded vermicular graphite (along mutually perpendicular axes), sequentially or simultaneously. Thus, for example, triaxially compressed dense graphite compacts can be made in accordance with the present method which have electrical conductivity values essentially equal in all three mutually perpendicular axes (i.e. perfectly isotropic). Biaxially and uniaxially compressed dense graphite compacts have unequal conductivity values between at least two of the three mutually perpendicular axes. It is to be understood that triaxially compressed vermicular graphite does not show the high electrical and thermal conductivities in a preferred direction and it may not show anisotropic properties as does uniaxially and biaxially compressed vermicular graphite (at the same density) but rather may show properties close to that exhibited by commercial Acheson-Process type polycrystalline graphite. However, advantageously, the triaxially compressed vermicular graphite can show higher density, lower permeability and less brittleness than synthetic Acheson-Process type polycrystalline graphite.

It is to be understood that the amount of anisotropy, the density, and the permeability of the dense compressed compacts is dependent on the amount of the compression forces employed, and on whether or not equal compression forces are used on the mutually perpendicular axes.

As with the uniaxially compressed material, biaxially and triaxially compressed vermicular graphite structures of various desired densities, up to about the theoretical limiting density of graphite (2.25 gms./cc.) readily are prepared.

Additionally, high density bonded-expanded vermicular graphite cohered structures exhibiting marked thermal and electrical anisotropic properties and mechanical properties can be prepared in accordance with the instant invention. In preparing such structures, the expanded vermicular graphite ordinarily is blended with an inorganic or organic bonding agent, ordinarily in the form of a fine powder, in an amount of from about 2 to about 55 weight percent and preferably from about 5 to about 45 weight percent bonding agent based on the total weight of the graphite-bonder mixture. This mass is then compressed at pressures greater than 1000 p.s.i. and usually from about 10,000 to about 25,000 p.s.i. to the desired density in the appropriately shaped mold or form. The so-formed composite is then treated to activate the bonding agent and promote adhesion within the compact.

The bonding agents are also useful in preparing low density articles in which compaction forces of from about 5 to 1000 p.s.i. are employed prior to activating the bonding agent.

Solid bonding agents ordinarily should be in the form of a fine powder and have a particle size of less than 100 mesh and preferably from about 200 to about 325 mesh.

Bonding agents which ordinarily are used in the instant invention are thermoplastic or thermodegradable materials and include (1) any solid organic polymer, (2) other organic compounds which, upon pyrolysis, yield a cementing char, (3) inorganic glass-like bonding agents and the like.

Examples of organic polymers suitable for use herein include but are not limited to polyethylene, acrylic and methacrylic polymers, polystyrene, epoxides, polyvinyl chloride, polyesters, polycarbonates, phenol formaldehydes, nylon, polytetrafluoroethylene, polyvinylidenefluoride, copolymers of the same, and the like. These bonding agents can be used along with any required catalyst or crosslinker.

Examples of such other organic char yielding substances suitable for use herein include coal tar pitches, natural asphalts, phenol-formaldehyde, urea-formaldehyde, polyvinylidene chloride, and copolymers containing polyvinylidene chloride, polymers of furfuryl alcohol, polyacrylonitrile, sugars, saccharides and the like.

Examples of inorganic glass bonding agents suitable for use herein are vitreous materials which include, glass-forming oxides such as boric oxide, silica, phosphorous pentoxide, germanium oxides, vanadium pentoxide, and the like or other inorganic salts that can be obtained as glasses such as beryllium fluoride, and certain sulfates, chlorides and carbonates. Especially useful in this invention are those glass-formers which will "wet" the graphite, such as $B_2O_3$, $P_2O_5$, or $V_2O_5$. Commercially available glasses also are suitable as bonding agents. Typical examples of such glasses are compositions containing as an ingredient various proportions of two or more of the following oxides: silica, aluminum oxide, sodium oxide, potassium oxide, magnesium oxide, cuprous oxide, barium oxide, lead oxide, or boric oxide.

Glass-forming oxides are defined as those oxides which are indispensable to the formation of oxide glasses. Those skilled in the art of glass-making will readily recognize that the above named oxides are generally employed in combination with other materials to obtain glass.

It has been found that certain inorganic compounds can be blended with expanded graphite prior to the compaction of the graphite into the desired articles, the inorganic compounds serving to increase the resistance of the graphite to high temperature oxidation. The compounds found to serve this purpose include $B_2O_3$, $P_2O_5$, $Ca_3(PO_4)_2$, $AlPO_4$, $Zn_3(PO_4)_2$ and $Na_2B_4O_7$. The compounds useful as oxidation-resistant additives may or may not be potential constituents of glass-forming formulations. The materials should be in a particulate form which will pass through a 100-mesh screen and preferably a 325-mesh screen. The effective concentrations of said oxidation-resistant additives generally are in the range of about 0.5 weight percent to about 10 weight percent of the graphite charge. At concentrations below about 0.5 weight percent the oxidation rate of the graphite article approaches that of the graphite article alone and at concentrations above about 10 weight percent there is no significant decrease in oxidation rate of the graphite and the inorganic additive begins to affect the physical properties of the graphite.

Liquid polymers usually are not employed as the bonding agent since these can prevent formation of highly densified composites, but may be advantageously employed wherein a low density compact is desired and the liquid polymer is hardenable, curable, or capable of being "set-up." However, a solid polymer or other bonding agents can be dissolved in a solvent and then sprayed on the vermicular expanded graphite prior to compaction. When this technique is used to make dense compacts the solvent is removed before compaction is attempted. Solvents suitable for use in dissolving solid polymers include, for example xylene, kerosene, $CCl_4$, acetone and the like.

The uniaxially, biaxially or triaxially compressed vermicular graphite compacts have properties vastly superior to Acheson-Process type polycrystalline graphite. However, desirable properties of these compressed compacts such as mechanical strengths, hardness, gas and liquid impermeability can be further improved (at a slight expense of reduced electrical and thermal conductivity) by bonding the compact as described hereinbefore.

The glass-bonded compressed graphite has a particular advantage in that it overcomes temperature limitations of the polymer bonded vermicular graphites. The polymer-bonded graphites generally undergo polymer decomposition at sustained temperatures above about 250° C. The glass bonded composites are useful at temperature above this limit.

However, if the product desired is to be a carbon-cemented dense vermicular graphite compact, the char yielding bonding agent-vermicular graphite blend should be baked at a temperature within the range of from about 800 to about 1200° C. until essentially all of the volatile constitutents are evolved. The ordinary range of residue carbon "cement" in such a carbon-cemented graphite structure is from about 1 to about 50 weight percent and preferably from about 5 to about 30 weight percent of the final product. Generally, as the carbon "cement" fraction decreases below about 1 weight percent, the structure resembles the unbonded compressed vermicular graphite. If the carbon "cement" content of the final product exceeds about 50 weight percent, the advantageous electrical and thermal conductivity properties of the expanded graphite fraction may be diminished.

Char yielding bonding agents suitable for use herein include, for example, asphalt, tar, sugars, phenol formaldehyde resins. If necessary for ease of mixing and shaping, a solvent such as xylene, kerosene, and the like can be used. While compressed expanded graphite in its various forms possesses an ability to withstand high temperature oxidation which is superior to almost all other forms of graphite, this characteristic may be enhanced to a remarkable degree by the addition thereto of minor amounts of oxides of boron or phosphorous or salts of borates and phosphates. Quantities of these additives of from 0.5 weight percent to about 10 weight percent will reduce the high temperature oxidation weight loss in the compressed vermicular graphite to as low as 25 percent of the value obtained without such additive. This is accomplished without any detrimental effect upon the other physical properties of the compacted graphite. The additive compounds such as $B_2O_3$, $Na_2B_4O_7$, $Ca_3(PO_4)_2$, $AlPO_4$, $Zn_3(PO_4)_2$ and the like are added to the low bulk density vermicular graphites as fine powders (at least 100 mesh and preferably less than 325 mesh in particle size). The mixture is then blended by such methods as tumbling and then compressed into the desired form.

In addition, bonded compressed vermicular graphite foil laminates can be costructed in accordance with the instant method. The graphite foil having a thickness of from about 0.001 to about 0.10 inch or greater, and preferably from about 0.003 to about 0.015 inch is prepared as described hereinbefore. Layers of the product graphite foil are bonded to one another with a bonding agent in a weight ratio of bonding agent to foil, of from about 1/20 to about ½. The bonding agent can be a liquid polymerizable monomer or prepolymer of a solid finely divided powder or a foil or film of the solid polymer, or char yielding substances. Examples of bonding agents that are suitable for use herein include polyethylene powder, polyethylene film, liquid phenol formaldehyde resins, powdered phenol formaldehyde resins, epoxy resins, polystyrene film, polymethyl cellulose film, fluorocarbon resins, silicone resins, polyesters, acetal co-polymers, polyamides, polycarbonate resins, coal tar pitches, natural asphalts, sugars, saccharides, inorganic glasses that wet graphite such as $B_2O_3$, borates, $P_2O_5$ and $V_2O_5$ and the like.

The so-produced bonded-expanded vermicular graphite foil laminate has extremely high electrical and thermal conductivity in the preferred directions (parallel to the plane of the foil) and unusually high electrical and thermal anisotropy, and is highly liquid and gas impermeable.

Furthermore, expanded vermicular graphite itself or a previously formed foil of the same can be compressed and bonded to polymeric and other types of flexible and non-flexible essentially non-electrically conductive substrates such as Saran film, polyethylene film, polyvinyl chloride film, paper, rubber, polystyrene, polymethyl methacrylate, polycarbonates, glass cloth, asbestos paper, ceramic and glass articles and the like. Where the polymer substrates do not have useful adhesion properties the bonding between the graphite surface and the non-conducting substrate can be accomplished by the use of conventional organic or inorganic adhesives which include for example, rubber cements, animal glues, sodium silicate solutions, epoxy resins, phenol formaldehyde resins, and the like. The electrically non-conducting substrates impart mechanical strengths to the graphite film and serve as an electrical or thermal insulation medium. Such substrates may totally enclose the graphite film as well as cover only a single surface.

Also, expanded vermicular graphite itself or a previously formed foil of the same can be compressed and bonded to flexible or non-flexible electrically conductive substrates. Electrically conductive substrates such as metal rods, bars, sheets or foils (Al, Mg, Cu, Mo, Fe, Ni, Ag, Ti, for instance) are coated with graphite according to this invention. Generally such substrates require a bonding agent to obtain adherence of the graphite such as water-glass, organic adhesives, protein glues, and other commonly available cementing or bonding agents. This affords a means for providing electrical or thermal conductors with a protective barrier coating which is resistant to corrosive or chemical attack, yet the coating is itself electrically and thermally conductive.

An improved form of a flexible, dense, impermeable graphite sheet material having excellent strength characteristics has been obtained by internally reinforceing the graphite compact with a metal mesh. Such a metal mesh-graphite composite is prepared by providing a layer of low density vermicular graphite, placing a metal mesh on this layer and applying an additional layer of vermicular graphite to the upper surface of the metal mesh. The system is then compressed under at least 500 p.s.i. and preferably above 10,000 p.s.i. to produce a cohered mesh-reinforced graphite sheet. Any flexible metal mesh may be employed but copper, bronze, steel, aluminum and nickel mesh are generally desirable. The form of the mesh is not critical and may be woven or may simply be a perforate foil. Metal mesh-graphite composites such as this are useful as high temperature gaskets, packing materials, thermal radiation shields, flexible conductors and the like.

A convenient method of applying a thin essentially continuous coating of graphite onto a substrate is to first coat the substrate with a tacky adhesive or bonding agent, then rub or press the expanded graphite onto the adhesive layer.

The products produced by the instant invention have varied uses depending on the shape, or form, and properties they possess. When vermicular expanded graphite is compressed in a suitable mold, shapes such as plates, rectangular solids, cones, rods, spheres, thin foils, hollow hemispheres and other more complicated configurations are formed. These solids find utility as thermal conductors or insulators, improved electrical conductors and in directional control of heat or electric current flow.

Articles made according to this invention find particularly good application as sealing agents, such as sealing rings, valve packing, and gaskets. Such articles may or may not be prepared in such a manner as to exhibit an anisotropic conductance property. Also such articles are capable of undergoing some deformation under high compression forces without shattering or breaking, whereas articles prepared for the same purpose by using the Acheson-Process type crystalline graphite or pyrolytic graphite are quite brittle and will shatter or break easily under commonly encountered deformation forces when used as gasketing or packing material.

The highly anisotropic flexible foil product by uniaxial compression can be used as a flexible electrical resistance element or an electrical strip heater, as gasketing material or chemically inert, low liquid- or gas-permeability sheet stock for lining vessels, pipes, and equipment surfaces by bonding said foil with conventional adhesives to the surface to be protected. In the same manner, the anisotropic characteristics of rods, bars, tubes and the like may be used to produce heating elements from the compressed graphite so long as the current path is parallel to the compression vector of the element.

Furthermore, a strip or sheet of compressed vermicular graphite can be employed as a heating element for a rug or carpet. The expanded vermicular graphite prepared as described hereinbefore, can be pre-formed into a continuous sheet before being placed against the rug-backing or can be compressed in situ against the backing after the graphite is introduced. An outer backing should then be applied to the compressed graphite layer. Electrical contact is established from the compressed vermicular graphite layer of the rug backing to a power source.

One manner of obtaining uniform electrical flow through the layer of compressed graphite thereby heating the rug or carpet is by embedding a metal screen wire of good conductivity in the graphite layer near each end of the graphite sheet, extending laterally from side to side for the purpose of distributing the electric current uniformly through the graphite. Each screen is wired to a power source.

The backing material can be any of the flexible nonconductive backings common to the rug-making industry. Further, the backing material can be replaced by or supplemented with a foam or cushion insulating material to retard the loss of heat from the rug into the floor beneath it.

The compressed graphite should be intimately adhered to the backing either by applying the graphite to the backing while the backing has adhesive properties or by employing an adhesive to hold the backing and graphite together. The outer backing itself should be adhered to the graphite for example by water-based or solvent-based adhesives. It is preferred that the outer backing be adhered to the inner backing at random points through small holes in the graphite layer. Such random adhesion between the two backing layers can be obtained, for example, by employing a water-based backing material (such as a latex) or a solvent-based material (such as a solution of backing material in a solvent). The liquid of fluid backing systems can be applied while in the liquid state, thereby obtaining sufficient impregnation of the perforated graphite material so that random adhesion between the backing layers is obtained.

Generally, expanded graphite, in an amount of about 0.5 to about 5 grams per square foot of rug backing should be used. The electrical conduction of the graphite strip or backing increases as its density and/or cross-section increases. Thus the thickness of the graphite layer to be used can be predetermined to obtain the desired resistance so that the desired amount of heat will be emitted when an electric current is passed through the graphite layer. For example, in order to maintain a temperature of from about 75 to about 150° F. within the rug or carpet for a 110–115 volt A.C. source (a wattage of about 5 to about 60 watts per square foot of rug area would be necessary) the thickness of the graphite layer should be about 0.005 to about 0.05 inch, if ambient temperature is about 70° F.

The highly anisotropic bonded structures and laminates find particular use in the manufacture of atmospheric re-entry nose cones for missiles, in the design of nozzles for solid fuel rocket motors, in the fabrication of improved electrical commutation brushes and in the construction of compact variable resistors.

The highly anisotropic supported graphite surfaces find utility as flat, graphite electrical conductors for use in corrosive environments, in electrical heating devices such as blankets, heating trays, domestic or industrial space heaters, process strip heaters and the like.

Compacts of expanded graphite and metal prepared by mixing the graphite with fine metal powder and subsequently compressing in one or more vectors produce highly conductive compacts which also show a high degree of anisotropy. Mixtures of graphite with from 5 to 75 percent by weight of a fine (preferably at least 100 mesh) metal powder produce compacts having exceptional high anisotropic ratios when compared to other metal compacts. Such metals as copper, silver, zinc, nickel, lead, silicon, iron and boron may be used. Alternately, easily reducible salts of metals may be used.

The compacts thus produced have good physical strength but improved physical strength may be produced by heating the compact to or near the melting point of the metal component to fuse or sinter it. Also organic or inorganic binders may be employed if desired. Such compacts find utility as electrical commutator brushes, polarizers for electromagnetic radiation and the like.

In preparing the expanded graphite, for use in the present invention, a particulate natural crystalline graphite is contacted at about room temperature with (1) a mixture of from about 8 to about 98 weight percent concentrated sulfuric acid (at least about 90 weight percent $H_2SO_4$) and from about 92 to about 2 weight percent concentrated nitric acid (at least about 60 weight percent $HNO_3$), or (2) fuming nitric acid, or (3) fuming sulfuric acid, or (4) concentrated sulfuric acid (at least about 90 weight percent $H_2SO_4$) or concentrated nitric acid (at least about 60 weight percent $HNO_3$) plus at least about 2 weight percent of a solid inorganic oxidizer such as, for example, manganese dioxide, potassium permanganate, chromium trioxide, potassium chlorate and the like. The resulting mix components usually are employed on a weight proportion basis of from about 0.2–2/1 (acid member/graphite). These are maintained in contact for at least about one minute, although a lengthy contact time of hours or days is not detrimental. The acid treated graphite, now expandable, is separated from any excess acid washed and dried, if desired. The acidified graphite is then heated until exfoliation or expansion occurs. The preferred method of heating is to contact the acidified graphite with a hydrocarbon flame (for example, a propane flame).

Alternatively, another method of preparing the expandable graphite which is subsequently expanded for use in the method of the present invention is to treat with an aqueous peroxy-halo acid, preferably perchloric or periodic acid, using an acid concentration of from about 2 to about 70 weight percent or more and an acid/graphite weight proportion of from about 0.5–2/1. The acid treated graphite, now expandable, is separated from excess acid, and heated to give the expanded feed stock.

The crystalline graphite also can be anodically electrolyzed in an aqueous acidic or aqueous salt electrolyte at an electrolyte temperature of from about 0 to about 80° C. at a minimum cell potential of about 2 volts. The total quantity of electricity passed is equivalent to from about 10 to about 500 ampere-hours per pound of graphite. Electrically treated graphite, now expandable, is separated from the electrolyte solution, and heated sufficently to cause expansion or exfoliation of the graphite flakes. The so-formed expanded graphite feed stock has a bulk density as low as 0.1 lb./ft.$^3$ and preferably less than 2 lb./ft.$^3$.

The following examples serve to further illustrate the method of the instant invention but are in no way meant to limit it thereto.

EXAMPLE I

The following procedure was carried out in order to compare the properties of compressed graphite structures prepared from expanded graphite in accordance with the instant invention as opposed to those graphite compacts prepared from unexpanded graphite.

Run A

A commercially available natural flake graphite (Dixon No. 1) having a flake size range of from about 20 mesh to about 50 mesh was wetted with a mixture of concentrated sulfuric acid plus concentrated HNO$_3$ (weight ratio of H$_2$SO$_4$ to HNO$_3$ being 2:1) and then washed free of excess acid. The so-acidified flake was heated with a propane torch to about 1000° C. thereby producing a loose particulate worm-like product having an apparent bulk density of about 0.18 lb./ft.$^3$.

A portion of the vermicular graphite was compressed to 10,000 p.s.i. to obtain flat slabs measuring 1¼ inches wide, 4⅝ inches long, and 0.040 inch thick. Another sample of the vermicular graphite was uniaxially compressed at 10,000 p.s.i. into blocks measuring 2 inches wide, 1.26 inches long, and 0.35 inch thick.

Similar sized slabs and blocks were prepared by uniaxially compressing to 10,000 p.s.i. the same type of natural flake graphite (Dixon No. 1) except that this particular sample of graphite had not been acid-treated nor expanded. In addition compacts were prepared from —200 mesh flake graphite (Dixon No. 635).

The several samples obtained were submitted to various physical tests to determine some of their physical properties. Table I summarizes some of these properties.

TABLE I.—FLAKED GRAPHITE

| Compact type | Specific resistance, microhm inches (1) | Specific resistance, microhm inches (2) | Resistance anisotropy ratio | Strength Tensile, p.s.i.[2] | Strength Compressive p.s.i., |
|---|---|---|---|---|---|
| Expanded graphite (Dixon No. 1) | 34,400 | 161 | 214:1 | 943 | 8,900 |
| Unexpanded graphite (Dixon No. 1) | 939 | 282 | 3.33:1 | 5 | 500 |
| Fine graphite powder (Dixon No. 635) | 1,960 | 460 | 4.26:1 | 37.5 | 1,200 |

[1] Parallel to compression vector.
[2] Perpendicular to compression vector.
NOTE: Dixon No. 1=20–50 mesh (U.S. Standard) graphite flake; Dixon No. 635=<200 mesh graphite powder.

It is to be noted that the compressed vermicular product prepared in accordance with the instant method as compared to the compacts made from unacidified and unexpanded graphite had an increased resistance anisotropy ratio of about 50-fold, an increased tensile strength of almost 200-fold, and an increased compressive strength of more than 17-fold.

Run B

In another run, a batch of commercially available grade of particulate Ceylon crystalline lump graphite (Cummings-Moore Grade No. 809) was wetted with a 60 percent HClO$_4$ solution (1:2 acid-to-graphite ratio) and then heated to about 400° C. thereby producing a fluffy product having a bulk density of about 7 lb./ft.$^3$. This product was uniaxially compressed to about 9700 p.s.i. to obtain thin flexible strips (1¼ inches x 4⅝ inches x 0.023 inch).

Another batch of untreated and unexpanded crystalline lump graphite was uniaxially compressed to about 10,000 p.s.i. to obtain similarly sized flexible strips. Various physical properties of these originally crystalline lump graphite are summarized in Table II.

TABLE II.—CRYSTALLINE LUMP GRAPHITE

| | Specific resistance, microhm inch[1] | Tensile strength, p.s.i.[1] | Compressive strength, p.s.i.[2] |
|---|---|---|---|
| Expanded graphite compact | 383 | 191 | 4,800 |
| Unexpanded graphite compact | 710 | 46 | 760 |

[1] Perpendicular to compression vector.
[2] Parallel to compression vector.

It is readily seen that expanding, then compressing the crystalline lump graphite improved its bulk conductivity and its tensile and compressive strengths.

Run C

A natural flake graphite (about 20 to 50 mesh, U.S. Standard Sieve mesh size) containing more than 95 weight percent carbon was treated with acid as in Run A and heat-expanded. This expanded graphite was uniaxially compressed to about 10,000 p.s.i. to yield a compact having an apparent density of about 1.75 gms./cc. The so-produced compact was found to have a specific resistance perpendicular to the compression vector of 131 microhm inches and a helium permeability measured parallel to the compression vector of 2.6×10$^{-6}$ cm.$^2$/sec.

EXAMPLE Ia

An excellent utility for the compressed expanded graphite product of the instant invention is to form it into a high strength, flexible, impermeable gasket material.

A gasket 6 inches in diameter and ⅛ inch thick was prepared by compressing 30 grams of expanded graphite (bulk density .2 lb./ft.$^3$) in a cylindrical mold of 6 inch inside diameter using 800 lbs./ft.$^2$ compression force. Holes were cut in the gasket to conform to four equispaced bolt positions of a flange of a reactor and the gasket was clamped into place between the flange and the reactor using only the four bolts. The temperature of the vessel was raised to 1600° F. and a reduced pressure of 30″ Hg was employed. The vessel was sealed off from the vacuum pump and the temperature was held constant. These conditions were maintained for 3 hours and no increase of pressure within the vessel occurred which indicated an air-tight seal was effected by the gasket. The gasket was removed and inspected and found to be undamaged and re-usable.

Similarly, the vessel was pressured to 3000 p.s.i. (hydraulic water pressure) and the pressure was maintained for 2 days. No leakage occurred and the gasket was found to be undamaged and re-usable.

To illustrate an additional utility, expanded vermicular graphite was compressed in a mold to form a dense article in the shape of a chevron-type valve packing ring. Several of these rings were used in a valve in place of the commonly used packing rings. The graphite rings were found to function leak-free for a much longer length of time than the packing normally used when put into service in a high temperature molten caustic line. The rings were compressible and did not break when the packing gland was tightened.

EXAMPLE Ib

An industrial grade of large natural flake graphite, commonly used in crucible manufacture, and having a mesh size range of 14 to 30 mesh, was treated with a mixture of concentrated $H_2SO_4$ and concentrated $HNO_3$ (weight ratio of $H_2SO_4$ to $HNO_3$ of 2:1) and the graphite was washed free of acid. The acid-treated graphite was contacted with the flame of a propane torch to produce an expanded graphite having an apparent bulk density of 0.18 lbs./ft.$^3$ and being vermicular in appearance. This expanded vermicular graphite was compressed uniaxially in a steel mold under about 11,000 p.s.i. to yield various sized compacts. The following data was obtained by testing the compacts:

TABLE II-A

| Property: | Measurement |
|---|---|
| Density | 1.89 gms./cc. |
| Specific resistance in the plane at right angles to the compression vector. | 131 microhm inches. |
| Specific resistance in the plane parallel to the compression vector. | 32,500 microhm inches. |
| Anisotropic resistance ratio | 248:1. |
| Tensile strength in the plane at right angles to the compression vector. | 1970 p.s.i. |
| Compressive strength in a direction parallel to the compression vector. | 7200 p.s.i. |
| Thermal conductivity in the plane at right angles to the compression vector given as cal./sec./cm.$^2$/C. °/cm. | 2.4 at −50° C., 1.7 at 75° C., 0.75 at 275° C. |
| Permeability to helium at 23° C. | $1.5 \times 10^{-5}$ cm.$^2$/sec. |

Similarly (varying the compressive force in the range of 5 to 60,000 p.s.i.), compacts have been prepared which had densities in the range of from about 0.03 to 2.1 gms./cc., tensile strengths up to about 3000 p.s.i., compressive strengths up to about 9000 p.s.i. and specific resistances down to about 120 microhm inches.

EXAMPLE II

Another portion of commercially available material flake graphite was acidified and expanded as described in Example I. The expanded vermicular graphite product had an apparent bulk density of about 0.2 lb./ft.$^3$ (0.0032 gm./cc.).

The vermicular graphite was then compressed at 50 p.s.i. into self-cohered blocks having an apparent density of about 0.25 gm./cc. One block was then recompressed at a vector at right angles to the initial compression vector to a pressure of about 16,000 p.s.i. thereby producing a compact having an apparent density of about 1.8 gm./cc.

This 16,000 p.s.i. block was found to have specific resistances of about 1400, 606, and 150 microhms in the second compression vector, first compression vector and uncompressed vector respectively and a maximum electrical anisotropy ratio of about 9.35 to 1.

Another block was uniaxially compressed to about 16,000 p.s.i. and showed a specific resistance perpendicular to the compression vector of about 146 microhms inches and a specific resistance parallel to the compression vector of about 24,600 microhm inches. Thus, this uniaxially compressed block had an electrical anisotropy ratio of about 169 to 1.

It is to be noted that biaxially compressed expanded graphite had a marked decrease in electrical anisotropy as compared to the uniaxially compressed expanded graphite.

In a third run, low bulk density expanded vermicular graphite prepared as described hereinbefore, was compressed in a series of molds in three mutually perpendicular vectors in the following sequence:

(A) Compressed to about 30 p.s.i. to yield a compact having a density of about 0.196 gm./cc.

(B) Compressed at right angles to the first compression vector to a pressure of about 150 p.s.i. thereby producing a compact having a density of about 0.694 gm./cc.

(C) Compressed in a vector mutually perpendicular to the first and second compression vectors to a pressure of about 10,000 p.s.i. to produce a triaxially compressed graphite block having a density of about 1.72 gms./cc.

The specific resistances were 630, 1260 and 1070 microhms along the first, second and third compression vectors, respectively.

Thus it is seen that the maximum electrical anisotropy ratio of the triaxially compressed vermicular graphite above was only about 2 to 1 whereas with biaxial compression, the electrical anisotropy ratio was about 9:1, and in uniaxial compression, the anisotropy ratio can reach values as high as 250:1 or more.

EXAMPLE IIa

In a manner similar to the foregoing, simultaneous compression of a pile of vermicular graphite from all directions (isostatic compression) yielded a compact electrically equivalent to sequential triaxial compression.

Vermicular graphite having an apparent bulk density of about 0.2 pound per cubic foot was compressed hydrostatically in a bag to a final pressure of about 950 p.s.i., to yield a compact having an apparent bulk density of 50.6 pounds per cubic foot. Rod segments were cut out of the compact in three mutually perpendicular axes and measured for specific resistance:

| Axis: | Microhm inches |
|---|---|
| No. 1 | 1270 |
| No. 2 | 1760 |
| No. 3 | 1430 |

Maximum electrical anisotropy was found to be 1.39:1 (between Axis No. 1 and No. 2) and the minimum anisotropy ratio was 1.12:1 (between Axis No. 1 and No. 3). Pressure of from about 5 to about 50,000 p.s.i. of hydraulic or pneumatic pressure may be used in this application.

EXAMPLE IIb

Another portion of the expanded graphite of Example I was placed into a thin-wall rubber cylinder and the ends of the cylinder were fastened so that no compression would occur along the axis of the cylinder. Radial compression was applied to compact the graphite along all vectors perpendicular to the axis. The following results were obtained:

TABLE IIb

| Run No.: | Radial pressure applied, p.s.i. | Compact density after application of pressure, gms./cc. | Electrical resistivity in axial direction, microhm inches |
|---|---|---|---|
| 1 | 100 | 0.27 | 860 |
| 2 | 300 | 0.65 | 357 |
| 3 | 4,000 | 1.52 | 161 |
| 4 | 50,000 | 1.92 | 155 |

It was found that sheets, foils, or discs could be cut, shaved, or sliced from the resulting essentially cylindrically shaped compact.

EXAMPLE IIc

Graphite resistance heating elements were prepared in accordance with the instant invention as follows:

Vermicular graphite having an apparent bulk density of about 0.3 pound per cubic foot was fed into a long tube having a diameter of 2.2 centimeters. A piston was inserted into the tube which compressed the vermicular graphite to a pressure of about 100 p.s.i. The compressed vermicular graphite rod thereby produced had an apparent density of 0.495 gram per cc. and was found to have a specific resistance parallel to the rod axis of 11,800 microhm inches.

The vermicular graphite rod (2.2 cm. dia.) was clamped between two large copper plates and 600 amps (A.C.) was passed through the rod at a potential of 13 volts across 6 centimeters of rod length. This rod exhibited a surface temperature of 2350° C.

Another rod was compressed from vermicular graphite in the same tube mold to a pressure of about 300 p.s.i. This product rod had an apparent density of 1.03 grams per cc. and was found to have a specific resistance of 17,600 microhm inches or was electrically equivalent to a graphite rod 50 times longer at the same diameter.

The second vermicular graphite rod (1.03 grams per cc.) was connected across an arc welder in a fashion similar to the above example and 740 amps was passed through the rod with a potential drop of 24 volts across a 3.8 cm. long rod. The heating rod surface temperature was observed to be 2540° C. (optical pyrometer) at a power density of 710 watts per cubic centimeter of heater rod.

Thus it is seen that graphite rods formed by compressing expanded vermicular graphite in such a way that the compression vector was parallel to the current path of the finished heating element, exhibits high electrical resistance values along the vector parallel to the compression vector. The vector perpendicular to said compression force, however, exhibited high thermal conductivity.

EXAMPLE IId

Run 1

Highly conductive, highly anisotropic compacts were prepared by gently blending vermicular graphite having an apparent bulk density of about 0.3 pound per cubic foot with varying ratios of copper powder (−100 mesh). These mixtures were then compressed uniaxially in a steel mold to a pressure of 10,000 p.s.i. to yield cohered compacts containing 47.5 weight percent copper and 75 weight percent copper.

Another set of compacts was prepared by blending powdered natural flake graphite (unexpanded) with the same copper powder, and this mixture was also compressed uniaxially to 10,000 p.s.i. in the same mold to yield compacts containing 50 weight percent and 75 weight percent copper.

Electrical resistance measurements were made on each of the compacts, both in a direction parallel to the initial compression vector and perpendicular to the compression vector. The summarized data is shown in the following table.

TABLE IId

| Compact type | Specific resistance, ohm inch | | |
|---|---|---|---|
| | Parallel to compression vector | Perpendicular to compression vector | Anisotropy ratio |
| Compressed vermicular graphite plus 47.5 wt. percent Cu | 35,300 | 209 | 168:1 |
| Compressed vermicular graphite plus 75 wt. percent Cu | 960 | 63.4 | 15.2:1 |
| Natural flake graphite plus 50 wt. percent Cu | 1,050 | 323 | 3.25:1 |
| Natural flake graphite plus 75 wt. percent Cu | 25 | 10.9 | 2.29:1 |

Run 2

An additional highly conductive highly anisotropic compact was prepared by blending silver powder with low bulk density vermicular graphite, then compressing uniaxially to about 10,000 p.s.i. to yield a compact containing 62.1 wt. percent silver. This compact was then heated to 940° C. to form a sintered mass having an apparent density of 2.82 grams per cc. This composite was found to have a specific resistance value of 18,900 microhm inches parallel with the compression vector and 126 microhm inches perpendicular to the compression vector giving an electrical anisotropy ratio of approximately 150:1.

Run 3

Another metal-expanded graphite compact was prepared by gently blending 5.5 grams of low bulk density vermicular graphite with 33 grams of ultrafine nickel powder (derived by decomposing nickel formate). This mixture was uniaxially compressed in a mold to about 10,000 p.s.i. to yield a cohered composite. Then this composite was heated in an inert atmosphere to 1100° C. to form a sintered compact having a specific resistance in the preferred conductivity direction (perpendicular to the compression vector) of 187 microhm inches and an electrical anisotropy ratio of 12.2:1.

Run 4

Another metal-expanded graphite compact was prepared by blending sufficient silicon powder (−200 mesh) with vermicular graphite and then uniaxially compressed to 10,000 p.s.i. to yield a compact containing 47.5 weight percent silicon. Specific resistance of this compact in the preferred direction was 437 microhm inches and parallel to the compression vector, the value was 34,300 microhm inches, yielding an electrical anisotropy ratio of 79:1.

Other graphite composites containing boron, lead, zinc, and iron were also found to show anisotropic properties.

EXAMPLE IIIa

A natural flake graphite having a flake size in the range of from about 20 to about 50 mesh was acid-treated and flame expanded in a manner similar to that described in the previous examples. The apparent bulk density of this vermicular graphite was about 0.2 lb./ft.³. A plate-type mold was filled with an approximately 3 inch thick layer of the vermicular graphite and uniaxially compressed to about 10,000 p.s.i. thereby producing a highly flexible graphite foil. The foil had a thickness of about 0.006 inch, a density of about 1.7 gms./cc., and a specific resistance in the plane of the foil of about 160 microhm inches.

In a manner similar to the foregoing, sheets having a thickness of about 0.001 or 0.002 inch can easily be produced by reducing the thickness of the original pile height of expanded graphite and compressing or rolling the preformed sheet.

In addition, compressed vermicular graphite coatings were applied to various substrates by compressing, rubbing, bonding, rolling, and the like to various surfaces such as saran film, polyethylene film, polyvinyl chloride tapes, paper masking tapes, glass cloth tapes, asbestos paper, ceramic plates, Pyrex plate, and the like, to impart more electrical conductivity to the surface at a given loading (i.e. grams of graphite per unit of surface area) than the previously known varieties of particulate graphites or carbon.

EXAMPLE IIIb

A thin coating of graphite on a metallic substrate was prepared by the following procedure: a 6-mil thick foil, prepared by compressing expanded vermicular graphite, was bonded to a 10-mil thick sheet of a magnesium base alloy by using a thin coating of rubber adhesive between the metal and graphite. This yielded a highly flexible graphite-coated metallic substrate which was electrically conductive across the thickness of the sheet. The liquid impermeable graphite coating was found to be an effective barrier coating against concentrated HCl and other corrosive agents.

Similarly, other substrates such as iron, aluminum, steel, nickel, and copper articles have been coated with graphite using bonding agents such as epoxides, molten organic polymers, silicone adhesives and animal glues. Also metallic articles have been coated with graphite by first coating the article with a tacky or pressure-sensitive adhesive, then rubbing or pressing expanding vermicular graphite onto the adhesive. The so coated graphite substrates were found to electrically conduct across the thickness of the substrate. Further the liquid impermeable coating was an effective barrier against corrosive agents.

Other conductive substrates such as aluminum and copper foils may also be used. The graphite coating gives the metal foil a protective coating without interfering substantially with its electrical properties. Adherence of graphite to the metal substrate is improved by using a thin film of adhesive but this is not required for a successful coating.

EXAMPLE IIIc

Run 1

Metal mesh-reinforced graphite sheets were prepared in accordance with the instant invention as follows: Expanded vermicular graphite, having an apparent bulk density of about 0.4 pound per cubic foot, was poured onto a mold to form a layer about 3 inches deep. A sheet of 100-mesh copper screen was placed on the pile of vermicular graphite and then another 3-inch deep pile of more vermicular graphite was placed on the copper screen. The layered system was then compressed to a pressure of about 16,000 p.s.i. to yield a well cohered, flexible, impermeable metal mesh-reinforced graphite sheet. This sheet, containing 41.8 weight percent graphite, having a thickness of .023 inch, had a surface resistance of $1.58 \times 10^{-3}$ ohms per square and a specific resistance of 36.2 microhm inches.

Run 2

The above procedure was repeated using a 200-mesh nickel screen as the reinforcing mesh. The sheet, having a thickness of .016 inch, and containing 61.4 weight percent graphite, was found to have a specific resistance (in the plane of the sheet) of 62.9 microhm inches.

Run 3

The above procedure was repeated by using a heavy gauge 16-mesh nichrome screen as the reinforcing agent. The compressed, reinforced sheet, containing 25.3 weight percent graphite and having a thickness of .035 inch, was found to have a specific resistance of 240 microhm inches. The tensile strength of this reinforced sheet was in excess of 8,000 p.s.i.

Run 4

The above procedure was repeated by using an 18-mesh galvanized iron screen as the reinforcing agent. The compressed (10,000 p.s.i.), reinforced sheet containing 60.8 weight percent graphite, having a thickness of .035 inch, showed a specific resistance (in the plane of the sheet) value of 292 microhm inches.

Run 5

An 18-mesh bronze screen reinforced flexible graphite sheet, containing 36.9 weight percent graphite, was prepared by compressing the layered graphite-screen mass to about 700 p.s.i.; then the low density preformed sheet was further compressed by passing through a set of rolls. The .018-inch thick sheet, having a weight of about 100 grams per square foot, showed a specific resistance in the plane of the sheet of 66 microhm inches. The tensile strength of the bronze screen-reinforced foil was found to be 6600 p.s.i. The helium permeability was $9.9 \times 10^{-3}$ square centimeters per second (across the sheet thickness).

EXAMPLE IV

The following procedure was carried out in order to show a comparison of properties of polymer-bonded compressed vermicular graphite made in accordance with the instant invention as opposed to polymer-bonded graphite flake, graphite powder and graphite cloth.

Run A

A series of compacts were prepared as follows: Microfine polyethylene powder, having an average particle size of about —325 mesh, was dry-blended at weight percents of 5, 15 and 25 with the following forms of particulate graphite:

(a) Highly expanded vermicular graphite (Dixon No. 1) having an apparent bulk density of about 0.2 lb./ft.$^3$ and prepared as described in previous examples.

(b) Unexpanded flake graphite (Dixon No. 1).

(c) A finely powdered natural flake graphite (Dixon No. 635) passing through a 200 mesh screen.

The various polymer-graphite blends were poured into a mold and uniaxially compressed to a pressure of about 10,000 p.s.i. to produce flat slabs. These slabs were heated to about 400° F. for about 30 minutes to fuse the polyethylene binder.

Additional compacts of graphite were prepared containing no polymer binder.

Each of the compositions was prepared in triplicate and the following properties were measured:

(1) Specific resistance in the plane perpendicular to the compression vector.

(2) Tensile strengths perpendicular to the compression vector.

Table IVa lists the average results of these property measurements.

TABLE IVa

| Graphite type | Wt. percent polymer | Specific resistance (microhm in.) | Tensile strength (p.s.i.) |
|---|---|---|---|
| Vermicular graphite | 0 | 160 | 1,600 |
| Do | 5 | 231 | 1,253 |
| Do | 15 | 296 | 1,590 |
| Do | 25 | 357 | 1,596 |
| Do | 50 | 4,950 | |
| Large flake graphite | 0 | 280 | 4 |
| Do | 5 | 4,400 | 385 |
| Do | 15 | 40,700 | 583 |
| Do | 25 | 92,000 | 877 |
| Fine graphite powder | 0 | 460 | 38 |
| Do | 5 | 1,050 | 355 |
| Do | 15 | 1,450 | 1,370 |
| Do | 25 | 14,500 | 1,903 |

Determination of electrical anisotropy ratios of the polymer-bonded vermicular graphite showed them to range from about 150:1 to about 250:1. By contrast, the electrical anisotropy ratio of the graphite flake and powder composites showed them to range from about 2:1 to about 10:1.

Run B

In a like manner an expanded vermicular graphite having an apparent bulk density of about 0.5 pound per cubic foot was blended with microfine polyethylene powder, then compressed into self-cohered compacts having an apparent bulk density of approximately 0.3 gram per cc. Then these blocks were compressed at right angles to the initial compression vector at various pressures, then fused under slight pressure at 140° C.

The properties of these blocks (average of 3 values) are summarized below:

TABLE IVb

| Applied pressure 2nd vector (p.s.i.) | Density, g./cc. | Specific resistance in high conduction direction, microhm in. | Tensile strength parallel to specific resistance, p.s.i. |
|---|---|---|---|
| 3,470 | 1.32 | 281 | 2,590 |
| 6,430 | 1.47 | 255 | 2,530 |
| 10,300 | 1.50 | 238 | 3,060 |
| 13,850 | 1.58 | 236 | |
| 17,300 | 1.60 | 230 | 3,040 |

Note that the density and the specific resistance is sensitive to the applied forming pressures whereas the tensile strengths are less so.

Run C

Another set of vermicular graphite compacts was prepared from pure verimcular graphite and 15 weight percent polyethylene compressed to a density of 0.17 gram per cc., then recompressing these at right angles to the first compression vector to a final pressure of 12,500 p.s.i. The biaxially compressed composite containing polyethylene was fused as described in Run B. The properties measured on these composites are listed below.

TABLE IVc

| Property | Polymer-free | 15% polymer-bonded |
|---|---|---|
| Density, grams/cc. specific resistance in the uncompressed vector, microhm inches | 1.92 163 | 1.52 277 |
| Electrical anisotropy ratio between uncompressed vector and compressed vector | 2.18:1 | 2.60:1 |
| Tensile strength parallel to high conduction vector, p.s.i. | 1,700 | 3,510 |
| Tensile strength parallel to final compression vector (weakest direction), p.s.i. | 42 | 1,360 |

Run D

Expanded graphite having an apparent bulk density of 0.4 pound per cubic foot was blended, by tumbling, with 15 weight percent polyethylene powder (−325 mesh). This mixture was compressed into a block having an apparent density of 0.21 gram per cc., then compressed, at right angles to the first compression vector, to a block having a density of 0.775 gram per cc. Finally, the block was compressed in a vector normal to the first and second compression vectors to a final density of 1.55 grams per cc. (requiring a pressure of about 14,000 p.s.i.). The block was heated to fusion temperature of the polyethylene.

The resulting composite was found to have the following specific resistances:

Parallel to the 1st compression vector→1010 microhm inches

Parallel to the 2nd compression vector→2070 microhm inches

Parallel to the 3rd compression vector→816 microhm inches

Run E

In a manner similar to the foregoing other polymer binders such as vinyl chloride resins, polytetrafluoroethylene resins, solid epoxide powder resins and phenol formaldehyde resins when used as a binder for a vermicular graphite (having an approximate bulk density of about 0.2 lb./ft.$^3$) produced composites which were as conductive or more conductive than commercially available pure synthetic polycrystalline graphite as shown in Table IVe. In addition, biaxially and triaxially compressing the various polymer-bonded vermicular graphites resulted in a marked decrease in anisotropic properties.

TABLE IVe

| Polymer Binder | Wt. percent binder | Specific resistance (microhm inches) |
|---|---|---|
| Vinyl chloride resins | 5 | 181 |
| Do | 10 | 209 |
| Do | 20 | 330 |
| Polytetrafluoroethylene resins | 5 | 184 |
| Do | 15 | 210 |
| Do | 25 | 259 |
| Do | 35 | 365 |
| Solid epoxide powder resins | 5 | 176 |
| Do | 15 | 226 |
| Do | 25 | 333 |
| Do | 35 | 440 |
| Phenol formaldehyde resins | 5 | 204 |
| Do | 15 | 268 |
| Do | 25 | 344 |
| Polyvinylidene fluoride | 15 | 200 |
| Polychloroether | 15 | 204 |
| Polycarbonate | 15 | 208 |
| Nylon | 15 | 196 |

Run F

Graphite foil was prepared essentially as described in Example III with the exception that the expanded graphite was uniaxially compressed to about 700 p.s.i. thereby reducing the vermicular graphite from a loose pile about 3 inches thick to compacted sheets about .025 inch thick. These preformed sheets were passed through a successive set of rollers until their thickness was about 0.010 inch. This foil was found to have a density of 1.77 cms./cc., exhibited tensile strength in the plane of the foil of 2080 p.s.i., a specific resistance in the plane of the foil of 144 microhm inches, and a helium permeability value of $1.4 \times 10^{-5}$ cm.$^2$/sec.

Run G

A laminate was formed by alternately laying graphite sheets (formed as in Example III, Run B) and a 0.010 inch thick polyethylene film (approximately 49 layers of each). The composite laminate was compressed to about 1000 p.s.i. and heated to about 125° C. for about 5 minutes to fuse the laminate. The resulting laminate contained about 28.5 weight percent polyethylene, had an apparent bulk density of about 1.1 gm./cc.

For comparison purposes a graphite cloth-polymer bonded laminate was prepared as follows. A commercially available graphite cloth (National Carbon, WCB grade) was cut into squares and alternately laminated with polyethylene sheets. The stacked laminate was compressed to about 1000 p.s.i. and heated to about 125° C. for about 5 minutes to fuse the structure. The resulting graphite cloth laminate contained about 29 weight percent polyethylene and had an apparent density of about 0.69 gm./cc.

Various physical properties of these 2 types of graphite-containing laminates are listed in Table IVg.

TABLE IVg

| | Graphite foil laminate | Graphite cloth laminate |
|---|---|---|
| Density, g./cc | 1.1 | 0.69 |
| Specific resistance along the laminations, ohm inches | $345 \times 10^{-6}$ | $2,800 \times 10^{-6}$ |
| Specific resistance across the laminations, ohm inches | 328 | 3.12 |

In addition to the large electrical anisotropy ratio, the vermicular graphite laminate made in accordance with the instant method was found to be a highly impermeable structure capable of flexure over long lengths. The graphite cloth laminate was both highly gas and liquid permeable.

In a manner similar to that described in Run B of Example III, sheets of methyl cellulose film in one case and polystyrene film in another case were stacked alternately with compressed vermicular graphite sheets and cured to produce laminates. These laminates had excellent resistance anisotropic characteristics (40,700:1 and 7,200,000:1 for methyl cellulose and polystyrene, respectively).

Similarly, phenol-formaldehyde powdered resins and epoxy resins were used as binders for laminated vermicular graphite structures resulting in laminates having excellent resistance anisotropic properties.

It was further found that if preforations were made in the graphite foil layers then contact could be made through the perforations to obtain polymer layer to polymer layer bonding sites. Thus the tensile strength of the composite in the direction perpendicular to the laminations was improved.

In another modification, a graphite foil (.013 inch thick), made according to this invention, was coated with a liquid phenol-formaldehyde resin and then rolled on a ⅜-inch diameter wooden mandrel. The foil was cured thereby yielding a graphite laminate pipe having an I.D. of ⅜ inch and a ⅛-inch wall thickness; its specific resistance along the axis of the pipe was found to be about 372 microhm inches.

Also, laminations of alternating layers of graphite foil and metal foils (or sheets) were prepared using a bonding agent between the graphite and the metal.

EXAMPLE V

Carbon bonded compressed vermicular graphite was prepared in the following manner.

Vermicular graphite, having an apparent bulk density of about 0.3 lb./ft.$^3$ and prepared by a previously described method from a commercially available material flake graphite (having a particle size of from about 20 to about 70 mesh), was gently blended by tumbling with 20 weight percent coal tar pitch powder (having an average particle size of less than 200 mesh). This mixture was then compressed in a mold, uniaxially, at a pressure of about 10,000 p.s.i. The resulting compact, retained in a steel form, was slowly pyrolyzed in an essentially oxygen-free atmosphere over an 8 day period at a maximum temperature of 950° C.

The carbon-bonded vermicular graphite product was found to have an apparent density of about 1.65 gms./cc., a specific resistance of about 177 microhm inches in the plane perpendicular to the compression vector and about 7560 microhm inches in the direction parallel to the compression vector. This compact thus exhibited an electrical anisotropy ratio of about 42.7 to 1.

Another compact was prepared by blending natural flake graphite, the same as used in the above example in the unexpanded state, with 20 weight percent pitch powder, compressed in a mold to 10,000 p.s.i., uniaxially, and pyrolyzed in a manner identical to the previously mentioned composition.

This carbon-bonded flake graphite compact was found to have an apparent bulk density of 1.75 grams per cc. and a specific resistance value perpendicular to the compression vector of 221 microhm inches. The specific resistance of this compact parallel to the compression vector was 243 microhm inches which results in an electrical anisotropy ratio of about 1.1 to 1.

Note that the carbon-bonded vermicular graphite compact shows a slightly higher conductivity in the preferred direction than the carbon-bonded flake graphite compact, but the more striking difference is in the fact that the vermicular graphite is highly anisotropic whereas the flake graphite compact is essentially isotropic. These two composites also showed a striking difference in the compressive strength parallel to the compression vector: Carbon-bonded flake graphite→failed at 1520 p.s.i.; Carbon-bonded vermicular graphite→failed at 7200 p.s.i.; and the flake graphite compact was highly gas permeable whereas the vermicular graphite was relatively impermeable.

Another portion of the highly expanded vermicular graphite was blended with 40 weight percent pitch powder, then compressed in a mold to an approximate apparent bulk density of 0.2 gram per cc. The preformed compact was then rotated 90 degrees and recompressed to about 10,000 p.s.i. to yield a biaxially compressed slab. This slab was then pyrolyzed in a manner similar to the previous examples to yield a carbon-bonded biaxially compressed vermicular graphite slab which possessed the following properties:

(1) Density=about 1.31 grams per cc.
(2) Specific resistance in the uncompressed direction =about 231 microhm inches
(3) Specific resistance parallel to final compression vector=about 948 microhm inches
(4) Electrical anisotropy ratio→4.1:1
(5) Tensile strength (parallel to uncompressed vector) =about 1620 p.s.i.
(6) Helium permeabilty=about $1.2 \times 10^{-3}$ cm.$^2$/second Another portion of the 0.3 gm./cc. vermicular graphite was compressed to a pressure in excess of about 2000 p.s.i. thereby producing a flexible graphite foil having a thickness of about 0.010 inch.

This foil was cut into sheets and then each sheet was liberally sprinkled with a fine coal tar pitch powder (—325 mesh) and stacked in layers. The resulting laminated layers was then compressed to about 100 p.s.i. and heated to 400° C. under pressure. The elevated temperature caused the excess pitch to be forced out of the laminate. The laminate, upon cooling, was found to contain 5 weight percent coal tar pitch as a binding agent. Next, the laminate was clamped in a steel mold (to prevent distortion during the rapid "bake-out"), placed in an inert atmospheric oven and heated according to the following schedule:

(a) Gradually increased the temperature to 900° C. in a 6-hour period.
(b) Maintained the temperature at 900° C. for 1 hour.
(c) Gradually cooled.

The resulting graphite foil laminate was found to have a density of 1.24 grams per cc. This laminate was found to possess the following properties:

(a) Specific resistance parallel to the graphite laminations of about 186 microhm inches.
(b) Specific resistance perpendicular to the graphite laminations of about 18,000 microhm inches.
(c) Electrical anisotropy ratio of about 96.8:1.
(d) Compressive strength (compression force perpendicular to the graphite foil laminations) of about 8960 p.s.i.
(e) Transverse breaking strength.

Forced applied perpendicular to laminations—about 2020 p.s.i.

Force applied parallel to the laminations—about 3580 p.s.i.

For comparison, a carbon-bonded graphite cloth laminate was prepared in the following manner: A commercially available graphite cloth (National Carbon Co.) was cut into strips and each strip was liberally wetted with with molten coal tar pitch. Then each strip was stacked, one on the other, (while the pitch was molten) to form a laminated structure. This structure consisted of 31.4 weight percent graphite cloth. The pitch-bonded laminate was bolted between two strips of a mild steel holder (to maintain the shape of the laminate during pyrolysis) and pyrolyzed by the following schedule:

(a) Slowly heated to 500° C. over a 20-hour interval, (b) Then increased the temperature to 980° C. over a 4-hour interval, (c) Maintained the pyrolyzed composite at 980° C. for 2 hours, (d) Then cooled.

The resulting carbon bonded graphite cloth laminate was found to have an apparent density of 0.85 gram per cc. and was found to be highly gas permeable.

The specific resistance of this laminate parallel to the graphite laminations was found to be 5,900 microhm inches (over 30 times greater than the carbon-bonded graphite foil laminate). The specific resistance perpendicular to the laminations was found to be 18,000 microhm inches.

The electrical anisotropy ratio of this composite was 3.08:1 whereas the carbon-bonded graphite foil laminate was 96.8:1. Compressive strength of this laminate in its strongest direction was 2260 p.s.i.

Graphite foil, prepared in the same manner as described above, having a thickness of 0.010 inch, was coated with a molten petroleum pitch and thereafter was wrapped around a 1-inch diameter graphite rod mandrel. After wrapping on about a dozen layers of graphite foil, the laminate and mandrel were heated to about 200° C. and the mandrel was removed from the laminate. Next, the pitch-bonded laminate was heated in inert gas environment to about 500° C. for 8 hours, and then the temperature was increased to 950° C. in 4 hours.

The pyrolyzed carbon-bonded graphite foil laminated pipe was 1¼ inch O.D. and had an average thickness of about ⅛ inch. This pipe was found to have a helium permeability of $4.0 \times 10^{-4}$ cc. per second on one cubic centimeter at a pressure differential across the walls of one atmosphere. This value is in the order of 1000 times less permeable than commercially available polycrystalline Acheson-Process synthetic graphite.

EXAMPLE VI

In another embodiment of the instant invention, a compact having a low density and a relatively high binder content was prepared by admixing expanded graphite of a bulk density of about 0.2 lbs./ft.$^3$, with about 35 weight percent of a phenol-formaldehyde binder. The mixture was compressed uniaxially under 75 p.s.i. compression force into a compact. The compact was then pyrolyzed at 1000° C. After pyrolysis it had a density of about 0.31 gms./cc.

Similarly, a mixture containing expanded graphite and 15 weight percent finely powdered polyethylene were uniaxially compressed under about 25 p.s.i. compression force into a compact. The so-formed compact was heated to about 180° C. to fuse the polyethylene. The resulting structure had a density of 0.175 gms./cc. The specific electrical resistance was measured parallel to the compression vector and found to be about 2760 microhm inches. The specific resistance perpendicular to the compression vector was about 1630 microhm inches. Thus the anisotropic ratio was about 1.7 to about 1.0.

EXAMPLE VII

Glass-bonded vermicular graphite composites were prepared as follows: About 22 grams of a highly expanded vermicular graphite, (apparent bulk density of about 0.2 lb./ft.$^3$) prepared as described hereinbefore; were blended, by gentle tumbling, with about 22 grams of a commercially available lime glass powder having an average particle size of about −325 mesh. This mixture was uniaxially compressed to a pressure of about 10,00 p.s.i. thereby producing a rectangular slab. The resulting compact was bolted into a steel form (to prevent distortion during the fusion operation) and then heated in an inert atmosphere furnace to a maximum temperature of about 940° C.

The resulting glass-bonded vermicular graphite possessed the following properties:

(1) Density about 2.25 gm./cc.

(2) Specific resistance (a) perpendicular to the compress vector—About 460 microhm inches (b) parallel to the compression vector—about 30,200 microhm inches (3) Electrical anisotropy—about 65.6:1, In contrast, a composite prepared by blending a 1:1 weight ratio of natural flake graphite (the same variety used to prepare the vermicular graphite) and lime glass powder, then compressing the mixture to about 10,000 p.s.i. and fusing the glass by heating to 950° C. exhibited the following properties:

(1) Specific resistance (a) perpendicular to the compression vector—about 14,800 microhm inches (b) parallel to the compression vector—about 32,800 microhm inches (2) Electrical anisotropy ratio—2.22:1. Thus, it is readily seen that the glass-bonded vermicular graphite is about 30 times as conductive in the low resistance direction compared to the glass-bonded flake graphite and exhibits a substantially large anisotropic ration.

In a manner similar to the foregoing, boron oxide powder, and mixtures of lime glass and boron oxide or sodium tetraborate were blended with vermicular graphite to produce glass-bonded graphite which had properties similar to those described for the lime glass-graphite compact.

EXAMPLE VIII

About twenty-two grams of vermicular expanded graphite having an apparent bulk density of about 0.3 lb./ft.$^3$ were gently blended by tumbling with about 2 grams of finely powdered $Ca_3(PO_4)_2$ (−324 mesh). The blended mixture was then compressed uniaxially in a rectangular steel mold to about 10,000 p.s.i. to yield a well cohered, electrically and thermally anisotropic compact containing 8.34 weight percent calcium phosphate.

Another composite was prepared in the following way: about 23 grams of vermicular graphite was blended with 2 grams of finely divided anhydrous $B_2O_3$. This mixture was also compressed uniaxially to 10,000 p.s.i. to yield a well cohered, anisotropic graphite compact containing about 8 weight percent $B_2O_3$.

Still another compact was prepared from the same vermicular graphite, containing no additives, by compressing the graphite in the same mold to 10,000 p.s.i.

These three samples, along with an identical-sized piece of commercial polycrystalline graphite (National Carbon Company AGSR) were each placed in a separate 3-inch diameter cylindrical Vycor reactor. These reactors fitted with an inlet and exit tube for air passage, were each placed in a furnace, heated to 500 degrees C., and an air flow of 140 cc. per minute (S.T.P.) passed over the contained heated graphite samples. After 60 hours of sustained air oxidation of the graphite samples at 500 degrees C., the samples were cooled and weighed for oxidation loss. The results are summarized in the table below.

| Graphite type: | Graphite oxidation rate at 500° C.[1] |
|---|---|
| (1) Commercial polycrystalline (National Carbon AGSR) | 0.904 |
| (2) Pure biaxially compressed vermicular graphite | 0.332 |
| (3) Biaxially comp. verm. graphite containing 8.34% $Ca_3(PO_4)_2$ | 0.080 |
| (4) Biaxially comp. verm. graphite containing 8.0% $B_2O_3$ | 0.086 |

[1] Gms. loss/hr./ft.$^2$ surface.

EXAMPLE IX

A piece of carpet of pile construction, 2 feet x 8 feet in size, was coated on its underside by a latex. While the latex was still wet, expanded graphite, prepared as described hereinbefore, having a bulk density of about 0.2 lb./ft.$^3$, was compressed at a pressure of about 10 to 15 p.s.i. onto the latex to obtain a covering layer of graphite of about 0.01 inch in thickness. A strip of copper screen wire, about 3 inches by 22 inches in size, was embedded in each of the two ends of the graphite layer. Two conductor wires were silver-soldered to each piece of screen and were also attached to a two-prong male plug-in device. Another coat of latex was applied to the graphite layer so as to insulate the graphite. It was found that the latex penetrated the graphite layer at random points and made contact with the previous latex coating so that the graphite was held firmly in position.

The rug was plugged into a power source comprising a Variac and voltages ranging up to about 115 volts were applied. The rug heated uniformly, up to about 120° F. on the upper surface. The rug did not become hot enough to overheat the rug or its components nor injure the vinyl tile floor on which it was laying.

In another run, a strip of flexible urethane foam (2 feet x 8 feet x ¼ inch in dimension) was glued to the underside of the carpet. It was found that the use of the foam retarded loss of heat into the floor, but did not cause overheating of the rug.

Various modifications can be made in the instant invention without departing from the spirit or scope thereof, for it is to be understood that we limit ourselves only as defined in the appended claims.

We claim:
1. A method of making a heating carpet using a compressed vermicular graphite as a resistance heating element which comprises:
   (a) providing a supply of an expanded vermicular graphite having an apparent bulk density of from about 0.2 to about 2 pounds per cubic foot;
   (b) compressing said expanded vermicular graphite at pressures within the range of from about 50 to about 25,000 pounds per square inch in predetermined directions into predetermined forms of cohered graphite having a bulk density within the range of from about 18 to about 120 pounds per cubic foot thereby forming a compressed graphite sheet;
   (c) providing a carpet and a carpet-backing material;
   (d) placing said compressed graphite sheet against the carpet backing, said grapihte sheet being present in an amount of from about 0.5 to about 5 grams per square foot of carpet backing, placing said carpet backing aaginst said carpet, said backing being between said graphite sheet and said carpet;
   (e) applying an outer backing to said compressed graphite sheet;
   (f) establishing electrical contact between said compressed graphite sheet and a power source; and
   (g) allowing electric current to flow through said graphite sheet thereby heating said carpet.
2. A method of making a heating carpet using a compressed vermicular graphite as a resistance heating element which comprises:
   (a) providing a supply of an expanded vermicular graphite having an apparent bulk density of from about 0–2 to about 2 pounds per cubic foot;
   (b) providing a carpet and a carpet backing material;
   (c) compressing said expanded vermicular graphite against said carpet backing, said graphite being present in an amount of from about 0.5 to about 5 grams per square foot of carpet backing;
   (d) placing said carpet backing against said carpet;
   (e) applying an outer backing to said graphite-coated carpet backing;
   (f) establishing electrical contact between said compressed graphite layer and a power sources; and
   (g) allowing electric current to flow through said graphite layer, thereby heating said carpet.

References Cited

UNITED STATES PATENTS

| | | | |
|---|---|---|---|
| 1,137,373 | 4/1915 | Aylsworth | 23—209.1X |
| 2,025,586 | 12/1935 | Hall | 219—529 |
| 2,771,537 | 11/1956 | Lichtenstein | 219—529 |
| 2,781,439 | 2/1957 | Lane | 219—549X |
| 2,997,744 | 8/1961 | Stoddard et al. | 264—29 |
| 3,056,750 | 10/1962 | Pass | 252—511 |
| 3,287,684 | 11/1966 | Armbruster, Jr. | 338—211 |
| 3,323,869 | 6/1967 | Olstowski | 23—209.1 |

VOLODYMYR Y. MAYEWSKY, Primary Examiner

U.S. Cl. X.R.

156—312; 161—183; 219—529, 543